United States Patent
Miller et al.

(10) Patent No.: US 11,611,565 B2
(45) Date of Patent: Mar. 21, 2023

(54) SYSTEMS AND METHODS FOR PROVIDING AN INTERACTIVE MEDIA PRESENTATION

(71) Applicant: Canva Pty Ltd, Sydney (AU)

(72) Inventors: Neill Desmond Miller, Sydney (AU); Anthony Surtees, Sydney (AU); Robert Kawalsky, Sydney (AU); Andrew Dent, Sydney (AU)

(73) Assignee: Canva Pty Ltd, Sydney (AU)

( * ) Notice: Subject to any disclaimer, the term of this patent is extended or adjusted under 35 U.S.C. 154(b) by 0 days.

(21) Appl. No.: 17/248,842

(22) Filed: Feb. 10, 2021

(65) Prior Publication Data

US 2021/0306349 A1    Sep. 30, 2021

Related U.S. Application Data

(63) Continuation of application No. 16/286,123, filed on Feb. 26, 2019, now Pat. No. 10,938,832, which is a continuation of application No. 14/670,381, filed on Mar. 26, 2015, now abandoned.

(60) Provisional application No. 61/970,537, filed on Mar. 26, 2014.

(51) Int. Cl.
  *H04L 9/40*    (2022.01)
  *G06F 16/438*    (2019.01)
(52) U.S. Cl.
  CPC ........ *H04L 63/105* (2013.01); *G06F 16/4393* (2019.01)
(58) Field of Classification Search
  CPC ............................ H04L 63/105; G06F 16/4393

USPC .............................................................. 726/1
See application file for complete search history.

(56) References Cited

U.S. PATENT DOCUMENTS

| | | |
|---|---|---|
| 5,574,798 A | 11/1996 | Greer et al. |
| 8,448,057 B1 | 5/2013 | Walsh et al. |
| 8,504,905 B1 | 8/2013 | Walsh et al. |
| 8,887,052 B1 | 11/2014 | Young |
| 9,477,380 B2 | 10/2016 | Amijee |
| 9,516,271 B2 | 12/2016 | Verthein et al. |
| 2002/0194382 A1 | 12/2002 | Kausik et al. |
| 2003/0052859 A1 | 3/2003 | Finley |
| 2005/0039130 A1 | 2/2005 | Paul |
| 2009/0325142 A1 | 12/2009 | Beavers et al. |
| 2010/0076965 A1 | 3/2010 | Kamada et al. |
| 2010/0146496 A1 | 6/2010 | Stoddart et al. |
| 2011/0270948 A1 | 11/2011 | Zmuda |

(Continued)

*Primary Examiner* — Michael S McNally
(74) *Attorney, Agent, or Firm* — Finnegan, Henderson, Farabow, Garrett & Dunner, LLP

(57) ABSTRACT

A system for providing an interactive presentation to an audience device is provided. The system interfaces with a database storing presentation content and a workspace. The workspace stores the presentation content and additional content and storing one or more access policies and being associated with a first user. The system comprises a processor for executing one or more modules comprising a content creation and updating module configured to enable an updating of the presentation content and the additional content according to the one or more access policies; and a content access interface module configured to determine one or more portions of the presentation content and the additional content for accessing at the audience device according to the one or more access policies. A method for providing an interactive media presentation is also provided.

20 Claims, 13 Drawing Sheets

(56) References Cited

U.S. PATENT DOCUMENTS

| | | |
|---|---|---|
| 2012/0300080 A1 | 11/2012 | Batson |
| 2012/0327099 A1 | 12/2012 | Vojak |
| 2014/0118403 A1 | 5/2014 | Verthein et al. |
| 2014/0282013 A1 | 9/2014 | Amijee |
| 2014/0333509 A1 | 11/2014 | Yuann et al. |
| 2015/0067516 A1 | 3/2015 | Park et al. |
| 2015/0193089 A1 | 7/2015 | Berlin et al. |
| 2015/0281250 A1* | 10/2015 | Miller ................ G06F 16/4393 726/1 |

* cited by examiner

SYSTEMS AND METHODS FOR PROVIDING AN INTERACTIVE MEDIA PRESENTATION

RELATED APPLICATIONS

This application is a continuation of U.S. patent application Ser. No. 16/286,123, filed Feb. 26, 2019, which is a continuation of U.S. patent application Ser. No. 14/670,381, filed Mar. 26, 2015, which claims the benefit of priority to U.S. Provisional Patent Application No. 61/970,537, filed Mar. 26, 2014, all of which are hereby incorporated by reference in their entireties.

FIELD

The present disclosure relates to media content hosting, and more specifically, to methods and systems for providing an interactive media presentation.

BACKGROUND

Online presentation software tools enable a presenter to make a presentation to remote audiences over a network. Typically the software tools enable the presenter to send a Uniform Resource Locator (URL) via an electronic message (e.g., E-mail, Outlook™ invitation, etc.). The audiences can then access the presentation by connecting to the URL through a software browser. Some of the online presentation software tools also enable the presenter to receive information from the audiences (e.g., opinions about the content presented) during the presentation.

However, existing online presentation software does not enable dynamical selection of content for presentation based on an engagement between the presenter and the audience. Moreover, existing online presentation software tools also do not provide a means for the audiences and other people to engage with the presenter when the presenter is not presenting. Furthermore, existing online presentation software tools do not provide a means to track and quantify such an engagement, even when such engagement data can assist the presenter in improving the presentation.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION OF EXEMPLARY EMBODIMENTS

Figure 1:
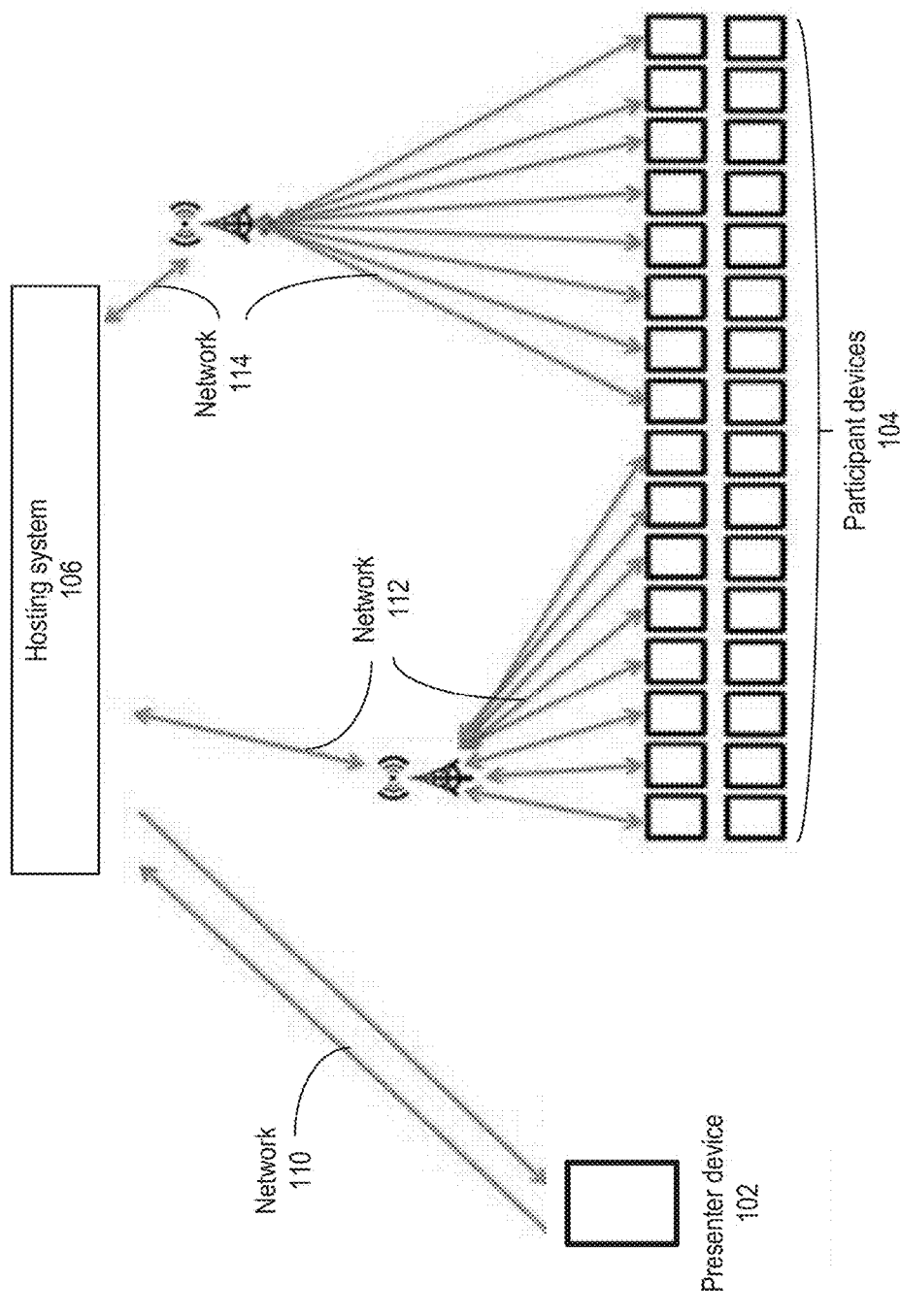
FIG. 1 is a diagram illustrating an exemplary system for providing an interactive media presentation, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Embodiments of the present disclosure provide a system for providing an interactive presentation to an audience device, the system interfacing with a database storing presentation content and a workspace, the workspace storing the presentation content and additional content and storing one or more access policies and being associated with a first user. The system comprises a processor for executing one or more modules. The one or more modules comprise a content creation and updating module configured to enable an updating of the presentation content and the additional content according to the one or more access policies. The system also comprises a content access interface module configured to determine one or more portions of the presentation content and the additional content for accessing at the audience device according to the one or more access policies.

In some embodiments, the content creation and updating module further includes a content workspace module configured to receive a request from the audience device to participate in the interactive presentation, create a copy of the workspace, and provide the copy of the workspace for accessing by the audience device. In some embodiments, the workspace can be associated with a Uniform Resource Locator (URL), which can include a predetermined string configured to indicate that the copy of the workspace is provided to enable the audience device to participate in the interactive presentation. In some embodiments, The URL can enable the content access interface module to determine to display a designated content to the audience until the interactive presentation starts. The URL can also be associated with another workspace designated by the first user.

In some embodiments, the content creation and updating module is further configured to include display configuration information in an electronic file storing the presentation content, the display configuration information enabling the audience device to adjust a displaying of the presentation content.

In some embodiments, the content creation and updating module is further configured to receive and store updates to the additional content by a second user. The workspace can also store contact information of the second user. In some embodiments, the content creation and updating module can detect an update to the presentation content and/or the additional content, and notify the second user about the detected update. In some embodiments, the notification of the second user can comprise storing a message at a workspace associated with the second user.

In some embodiments, the system further comprises a presentation analytics module configured to generate an assessment of a quality of engagement between the first user and the audience, and determine the one or more portions of the presentation content for displaying to the audience device based on the assessment. In some embodiments, the presentation analytics module can also analyze the additional content, and generate the assessment of a quality of engagement based on the analysis. In some embodiments, the presentation analytics module can also detect a selection of a presentation slide for displaying by the audience during the interactive presentation, and generate the assessment of a quality of engagement based on the detected selection. In some embodiments, the content creation and updating module is also configured to enable the first user to solicit a response from a second user associated with the audience device during the interactive presentation, and wherein the assessment of a quality of engagement is generated based on the response from the audience.

In some embodiments, the content access interface module further comprises a presentation content delivery module configured to dynamically modify the one or more access policies dynamically during the interactive presentation. In some embodiments, the presentation content delivery can modify the one or more access policies to enable the audience to access a first portion of the presentation content while the first user is accessing a second portion of the presentation content. The content creation and updating module can also dynamically modify the one or more access policies based on a response from an audience associated with the audience device during the interactive presentation.

In some embodiments, the system further comprises a communication module configured to enable and record communication between a second user and a third user.

Embodiments of the present disclosure also provides a method for providing an interactive media presentation, the method being implemented by a system interfacing with a database storing presentation content and a workspace, the workspace storing the presentation content and additional content and storing one or more access policies. The method comprises: receiving, from an audience device, a request to join the interactive media presentation; creating a copy of the workspace; providing the copy of the workspace for accessing by the audience device; selecting a first portion of the presentation content stored at the copy of the workspace for displaying at the audience device; receiving feedback information from the audience device; and selecting a second portion of the presentation content for displaying based on the feedback information. In some embodiments, the selecting of the first portion of the presentation content comprises updating the one or more access policies dynamically during the interactive media presentation.

Embodiments of the present disclosure facilitate engagement between presenter and audiences by providing a workspace for users to share their opinions about a presentation with other designated users. Embodiments of the present disclosure also enable the presenters to collect analytics on their presentations from various sources, including the opinions collected on the workspace, and to improve the engagement based on the collected analytics.

FIG. 1 is a diagram showing at a high level system 100 for providing an interactive media presentation between a presenter device 102 to participant devices 104, using some or all of the embodiments of the present disclosure described herein. Contents of the media presentation can be uploaded from presenter device 102, or other device, to a hosting system 106, which can also host the media presentation. Content may also be created at the hosting system 106. The contents of the media presentation can include any media data, such as video, audio, text, pictures, polls, and other interactive content. Presenter device 102 can transmit control data configured to control the flow of the media presentation, through network 110, to hosting system 106. Hosting system 106 can transmit data for the media presentation to participant devices 104 through networks 112 and 114. Hosting system 106 can also receive data related to the media presentation from participant devices 104 through networks 112 and 114. The data can include responses transmitted by the participants via participant devices 104, making the media presentation interactive.

In some embodiments, hosting system 106 enables a presenter to create a workspace associated with the media presentation. The workspace enables interaction between the presenter and the audience, before, during and/or after the presentation. For example, the workspace enables the presenter and the audiences to annotate the content in the media presentation, to add comments and ask questions, etc., and this information can be stored in the workspace. Hosting system 106 also enables creating of a network of users associated with the media presentation. For example, a user with access to the workspace (e.g., the presenter, the audience, and/or other people) can set different access rights to different parts of the information stored in the workspace, and associate the different access rights with different users. As a result, one or more associations between the users and the media presentation can be created via the workspace. Host system 106 can also standardize at least some of the stored content at a workspace (including the presentation content, the comments, the annotations, etc.) to a single format, and allow the converted content to be retrieved by searching according to the associated access rights. Host system 106 also enables multiple users to follow an event with respect to the media presentation by detecting the event (e.g., a new comment is stored in the associated workspace, a user has made a comment about the media presentation on an external website, the presentation content stored at the workspace has been modified, etc.), and notifying the users about the event.

In some embodiments, hosting system 106 also provides analytical data for assessing a quality of engagement between the presenter and the audience during the presentation. Hosting system 106 can extract data related to the media presentation, such as data collected during a live presentation (e.g., gestures and audio of the presenter), comments about the presentation (from internal sources such as the associated workspace and external sources such as the Internet), etc. Based on all these data, hosting system 106 can provide an assessment of the presentation, which can include inferences, recommendations, sentiments, contextual intelligence, insights, key concepts, key messages, etc. regarding the media presentation. In some embodiments, hosting system 106 can also derive an inference about a personal preference of an audience based on these data, and provide automatic customization of the presentation based on inferred personal preference, during a presentation to that audience.

Presenter device 102 and participant devices 104 can be a mobile device or computer interface such as, for example, a mobile telephone, a tablet, a computer (which may be part of or incorporated/embedded in a moveable platform) or consumer electronics device that may include wearable technology. Hosting system 106 can include one or more programmed computers and associated hardware/software configured in a computer server environment that can communicate with presenter device 102 and participant devices 104. Networks 110, 112, and 114 can be either a wireless network or a wired network, and can be at different geographical locations.

The system and techniques described in the present disclosure may be, among other things, used and/or employed in systems for advertising, any meetings involving two or more people, conferences and events, broadcast television, information for tourist attractions, Product or service information, teaching, and information delivery.

Figure 2A:
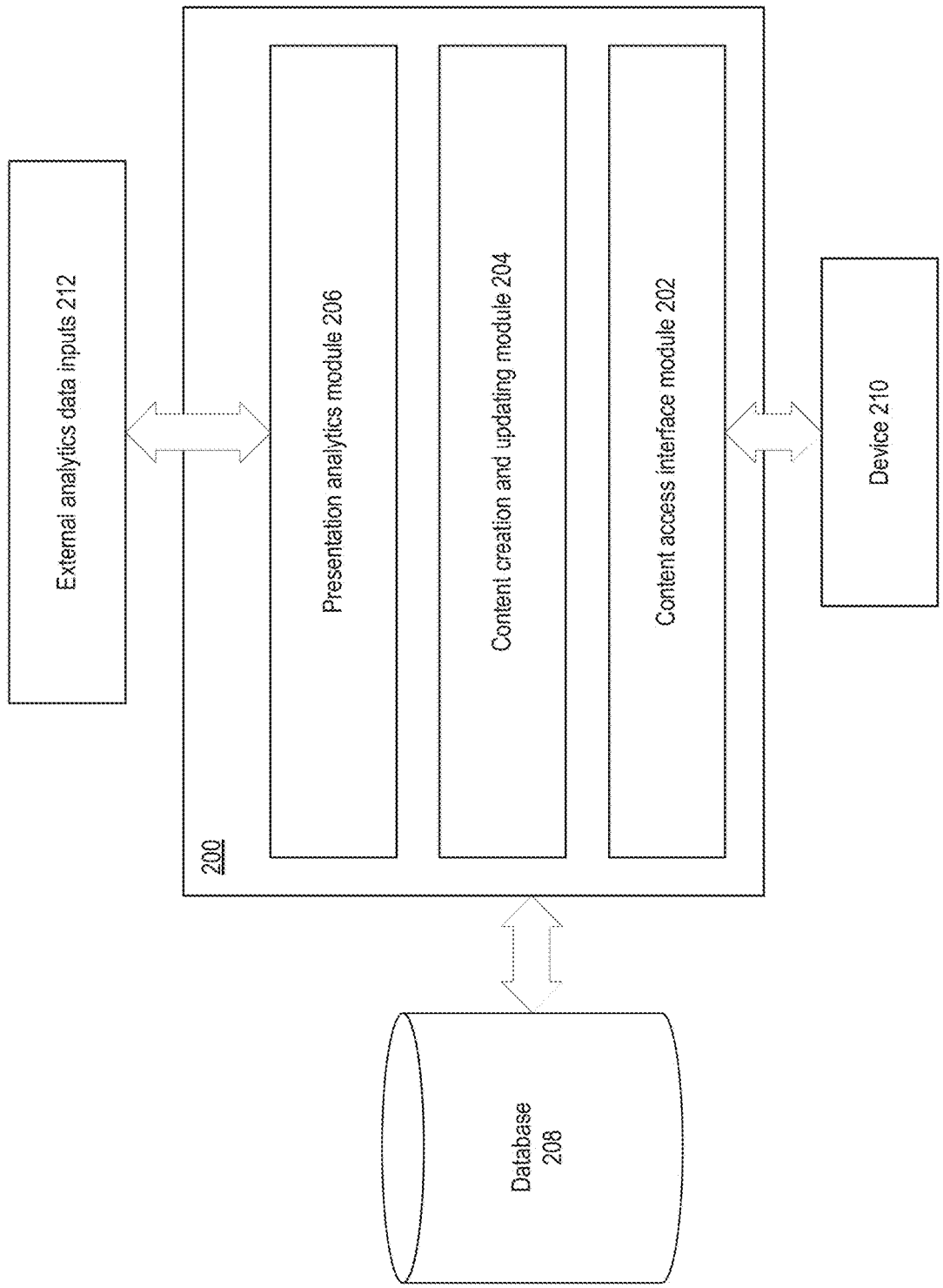
FIGS. 2A-2E are block diagrams illustrating an exemplary interactive presentation system for providing an interactive media presentation, consistent with embodiments of the present disclosure.

FIG. 2A is a block diagram illustrating an exemplary interactive presentation system 200 for providing an interactive media presentation, consistent with embodiments of the present disclosure. In some embodiments, interactive presentation system 200 can be implemented as part of or the entirety of hosting system 106 of FIG. 1. Interactive presentation system 200 includes a content access interface module 202, a content creation and updating module 204, and a presentation analytics module 206.

Content access interface module 202 allows a device 210 (e.g., presenter device 102 and participant devices 104 of FIG. 1, and a device operated by other users, etc.) to access the content of the media presentation and the associated workspace. In some embodiments, different access policies can be implemented at content access interface module 202 with respect to the content accessible through the workspace (e.g., which part of the presentation content is to be provided to the audience, which part of the comments are made publicly accessible, etc.). As to be discussed later with respect to FIG. 2C, different access policies can also be implemented during the interactive media presentation, such that the presenter can exercise different degrees of control over which portion of the media presentation the audiences have access to.

Content creation and updating module 204 enables a presenter to upload or create content of the media presentation, and to create a workspace associated with the media presentation. Content creation and updating module 204 also enables a user to add and edit annotations, comments, questions, etc. at the workspace. In some embodiments, Content creation and updating module 204 can also be configured to notify other users about an event with respect to either the content or the associated workspace (e.g., a new comment is added, the presenter has modified the presentation content stored at the workspace, etc.). As to be described below with respect to FIG. 3, the workspace can store presentation content 302, additional content 304 (e.g., recorded video and audio data of the presentation from the side of the presenter and/or the side of the audience), access history 306, and access right definition 308.

Presentation analytics module 206 can be configured to extract data related to the media presentation, such as data reflecting the presenter's handling of the media presentation, comments about the presentation, etc. Presentation analytics module 206 can extract data from internal sources, such as the workspace itself, and external sources, such as external analytics data inputs 212. In some embodiments, external analytics data inputs 212 can include one or more websites where other users have posted comments about the media presentation (e.g., Twitter™, Linkedin™, Facebook™, etc.). Presentation analytics module 206 can then perform an analysis of the extracted data to assess a quality of the presentation, and to infer a personal preference of an audience. In some embodiments, presentation analytics module 206 can interact with content access interface module 202 to control which portion of the media presentation to be provided for displaying to a particular audience, based on the personal preference information of that audience. In some embodiments, presentation analytics module 206 can also add tags and annotation to the presentation content based on a result of the analysis.

As shown in FIG. 2A, interactive presentation system 200 can also interface with a database 208 configured to store the content of media presentation and the associated workspace. In some embodiments, database 208 can be part of interactive presentation system 200. In some embodiments, database 208 can be associated with an URL, enabling database 208 to be accessible through the Internet.

Figure 2B:
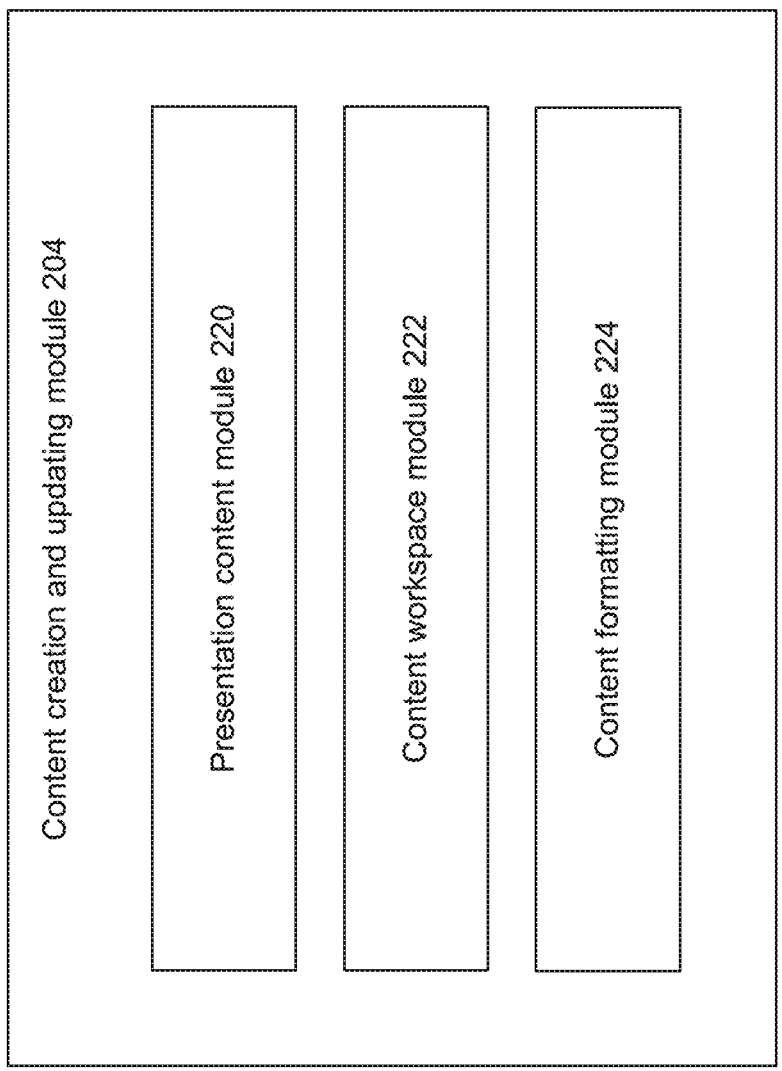

FIG. 2B is a block diagram illustrating various components of content creation and updating module 204. As shown in FIG. 2B, content creation and updating module 204 includes a presentation content module 220, a content workspace module 222, and a content formatting module 224.

Presentation content module 220 enables a user (e.g., a presenter) to store an electronic file for a media presentation at database 208. Presentation content module 220 enables a user to upload a previously-created presentation file of various formats, such as Powerpoint™, Keynote™, Portable Document Format (PDF), etc. Presentation content module 220 also enables a user to embed content from external sources into the electronic file. The external sources includes but not limited video sharing websites (e.g., Youtube™ and Vimeo™), photo sharing websites, financial data, weather or any websites that provide contents. Presentation content module 220 also enables a user to create the electronic file. The presentation thus created can include slides, polls, and interactive slides that allow the audiences to the presentation to provide information during the presentation. Presentation content module 220 can also add display configuration information to the electronic file of the presentation. The display configuration enables a browser operating to display the slide content on a display screen to automatically adjust a display of slide content (e.g., font size, pictures, etc.) according to the display screen size and orientation. A user can also define access rights with respect to the presentation. For example, a user can limit access to a particular portion of the presentation content (or its entirety) to a specific group of users. As to be discussed later, the access right can be set either manually (e.g., by a user entering information into the access right definition portion of a workspace), or automatically set by interactive presentation system 200 during a live presentation. The presentation content data can be stored in database 208.

Figure 2E:
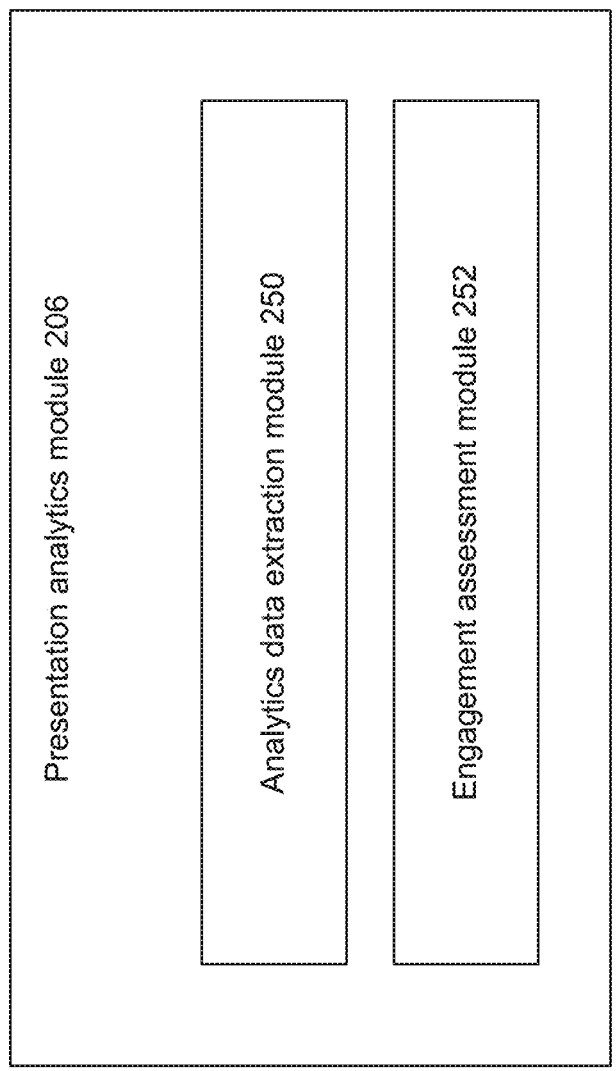
Figure 3:
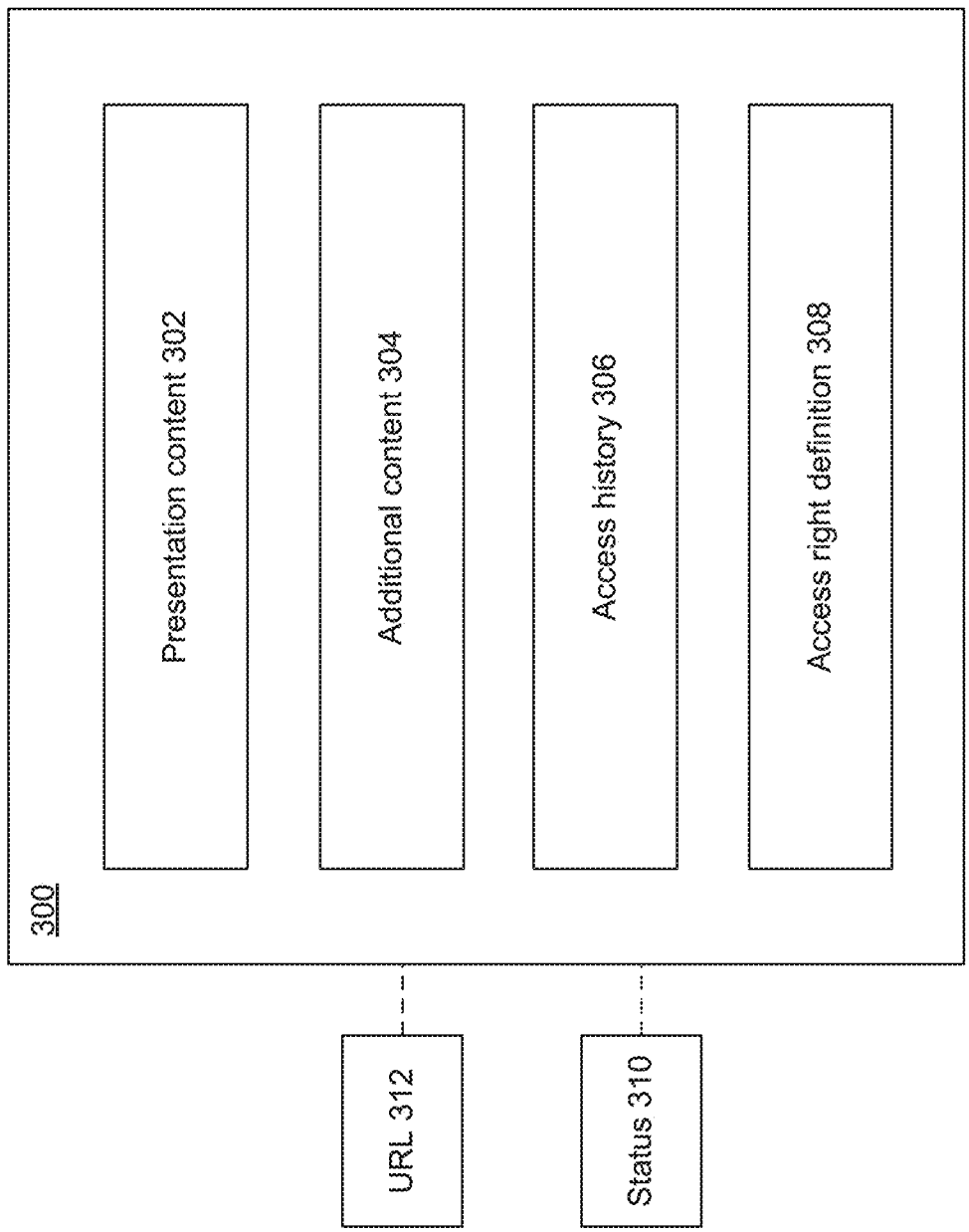
FIG. 3 is a diagram illustrating an exemplary data structure for providing a workspace associated with an interactive media presentation, consistent with embodiments of the present disclosure.

Content workspace module 222 enables a user (e.g., a presenter) to create or update a workspace associated with the media presentation. Reference is now made to FIG. 3, which illustrates an exemplary workspace 300. Workspace 300 can store a reference (e.g., a link) to presentation content 302, which can be stored separately from the workspace. Workspace 300 can also store additional content 304. Additional content 304 can include data about any content or event that is related to presentation content 302. For example, additional content 304 can include audio and video content recorded before, during and/or after the delivery of the presentation. Additional content 304 can also include tags, annotations, questions, and comments which reflect the interaction between the presenter and the audiences (or a third party) related to the presentation. Additional content 304 can also record an event (and the associated timestamp) of updating the presentation content. Moreover, as to be described later with respect to FIG. 2E, presentation analytics module 206 can also extract data related to the media presentation from both external sources and internal sources (e.g., the workspace), and the extracted data can also be stored as part of additional content 304.

During the media presentation, workspace 300 can be provided to the presenter to conduct the presentation (e.g., to enable the presenter to access the presentation content). Workspace 300 can also be provided to the audiences to view the presentation as controlled by the presenter, or during other times when the presenter is not presenting.

Workspace 300 can be represented by one or more electronic files, with each electronic file representing a state of the workspace. Each time a user (e.g., a presenter, an audience, or a third party) accesses workspace 300, content workspace module 222 creates a new electronic file representing the latest state of the workspace, which incorporates all of the most recent modifications or additions to presentation content 302 and/or additional content 304 right before the workspace is accessed.

Workspace 300 also includes access history 306, which stores information about, for example, an identity of the user who accesses a particular copy of the workspace, a timestamp indicating when the user accesses that copy, etc. In some embodiments, content workspace module 222 can detect updates to the contents stored in the workspace and notify the users listed in access history 306 about the updates, to enable the users who have accessed the workspace to follow the development of the content stored in the workspace.

Workspace 300 also includes access right definition 308. As discussed before, presentation content module 220 enables a user to set access rights with respect to different portions of the presentation content (e.g. presentation content 302). The access right information can be stored in access right definition 308. The access right information can be represented in various formats. For example, access right definition 308 can include one or more mapping tables. Each mapping table can associate a user with a reference to the portion of the presentation content the user is authorized to access. The mapping table can also associate a type of access right (e.g., read-only right, or edit right) with the user and with the pertinent portion of the presentation content. Access right definition 308 can also include access right information with respect to additional content 304 (e.g., tags, annotations, questions, and comments which reflect the interaction between the presenter and the audiences) as well.

Moreover, the access right information stored in access right definition 308 can be modified dynamically during a live presentation by content access interface module 202. The access right information can be modified according to a mode of operation during the live presentation. For example, in a presenter navigation mode, access right definition 308 can be dynamically updated such that only a particular presentation slide currently being presented by the presenter is accessible to the audience, and the audiences are not allowed to access other portions of the presentation. Alternatively, in an optional autonomous navigation mode, access right definition 308 can be dynamically updated such that additional portions of the presentation content, in addition to the presentation slide currently being presented by the presenter, becomes accessible to the audience. For example, the audiences can be granted access to either all of the presentation content, or part of it (e.g., being able to navigate forward or back only with respect to the particular slide being presented, or any portion designated by the presenter as accessible by a particular audience, etc.). At any time in autonomous navigation mode the presenter has the ability to reset the access right definition so that all of the audiences have access to the same presentation content, to cause the content view of all of the audiences to be synchronized. This function has been coined 'Getting on the same page."

In some embodiments, the workspace can be associated with a URL 312, which enables the workspace to be accessible over the Internet. The URL 312 can be included in an electronic message (e.g. Outlook™ Invitation) to an audience, who can then access the workspace by clicking on the URL included in the message. The URL can be automatically generated by content workspace module 222 when the workspace is created. In some embodiments, a special URL (e.g., a URL that includes a name string selected by a presenter) can be used to identify a workspace from which a live presentation is to be conducted. The special URL can be associated with, for example, a presenter, a company, an event, a topic, or a class. Such an arrangement, instead of using random strings to construct the URL, provides a simple and consistent way for the users to access any live presentation provided by a particular presenter or company, or for a particular event, topic, or class. As to be discussed later with respect to FIG. 2C, the special URL can also be used to control the content delivered to a user. The workspace can also be associated with a status 310 configured to store additional information (e.g., a summary of the presentation topic) about the workspace, to further facilitate a search and a retrieval for the workspace. In addition, the presenter can switch the workspace being associated with the special URL. Such an arrangement allows a user to use the same URL to access any workspace designated by the presenter, who may be switching to a different presentation workspace.

In some embodiments, content workspace module 222 also provides a notes tool that enables a user to create and edit textual notes (e.g. comments and questions), and annotations to be stored at the workspace.

The notes tool also enables the user to set different access rights to different parts of the textual notes. For example, after a user inserts a comment to the presentation for her own use, the user can mark that comment as private, so that the comment is accessible only to her. On the other hand, after a user posts a comment or a question to be viewed by other users, the user can mark the comment and the question as public, so that the comment is accessible to other users. The user can also further customize the access rights for the textual notes so that the notes become accessible to a selected group of users. As discussed before, these access rights information can be stored in the access right definition (e.g., access right definition 308) of the workspace.

Moreover, the notes tool can also be configured to link the notes and annotations to a portion of the presentation content or the additional content (e.g., recorded video and audio), such that the user can navigate from a particular note or annotation to the associated portion of the presentation content or the additional content. The notes tool also enables the user to organize the notes using tags. The users can also set the access policy to the content of the notes by designating portions of the notes to be shared with specific users, or publicly searchable, so that the users can use the notes tool to form a community forum to exchange information and comments related to the presentation. As discussed before, content workspace module 222 can detect the changes to the content stored in a workspace. Content workspace module 222 can also detect the changes to the notes and annotations, and notify the users listed in access history 306 of the workspace, enabling these users to follow the development of the workspace (e.g., new comments and questions posted, edits to the presentation, etc.).

In some embodiments, content workspace module 222 also manages the changes to the electronic files representing the workspace made by other users. Content workspace module 222 can maintain a master copy of the workspace that incorporates all the edits and additions to the content (e.g. presentation content and additional content) stored at the workspace. After providing an electronic copy of the workspace to a user, content workspace module 222 can detect the changes made by that user to the content stored in the workspace, and propagate the changes to the master copy of the workspace. In some embodiments, content workspace module 222 also enables a user to retrieve at least some of the electronic files representing the workspace, thereby enabling the user to access all of the previously-stored states of the workspace.

Referring back to FIG. 2B, content creation and updating module 204 also includes content formatting module 224. Content formatting module 224 provides a unified format of at least some of the contents (e.g., presentation content 302, additional content 304, etc.). As discussed before, presentation content module 220 enables a user to upload a previously-created presentation file of various formats, such as Powerpoint™, Keynote™, PDF, etc. Content formatting module 224 can convert a presentation file of various formats to a unified format, such as HyperText Markup Language (HTML), to facilitate searching of the presentation content. Content format module 22e can also convert at least some of additional content (e.g., additional content 304 including comments and questions) to HTML as well to facilitate searching of the additional content. In some embodiments; the converted content can includes teas and annotations added by a user or by presentation analytics module 206, as described before.

Figure 2C:
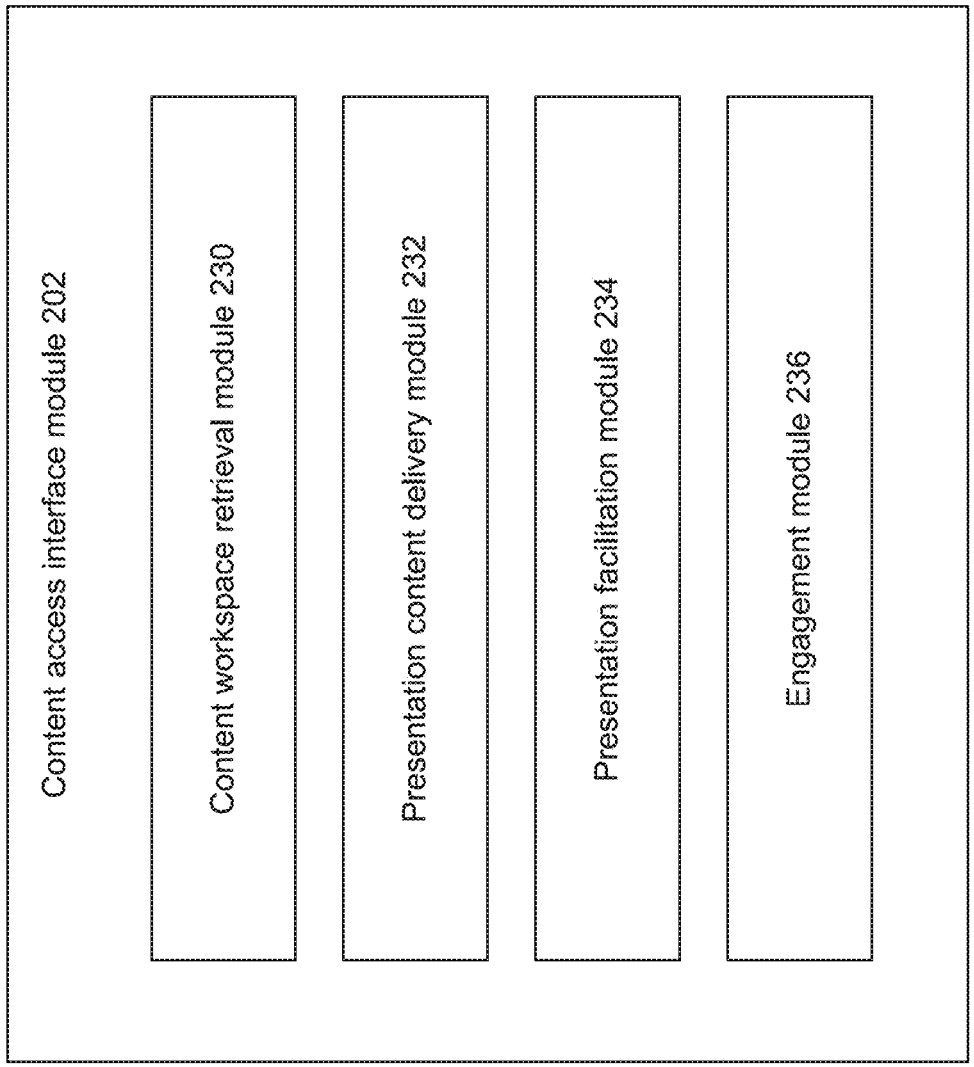

FIG. 2C is a block diagram illustrating various components of content access interface module 202. As shown in FIG. 2C, content access interface module 202 includes content workspace retrieval module 230, presentation content delivery module 232, presentation facilitation module 234, and engagement module 236.

Content workspace retrieval module 230 enables to a user to search for and retrieve a workspace. In some embodiments, content workspace retrieval module 230 can organize the workspace based on one or more criteria, such a popularity (of being searched), a particular subject, one or more attributes of the presenters associated with the workspaces, etc. Responsive to a search request, content workspace retrieval module 230 can create a list of URLs representing the workspaces, and a user can retrieve and access the workspaces by clicking on the URLs.

Presentation content delivery module 232 is configured to determine which portion of the presentation content stored in the workspace is to be displayed to a user at any given time. For example, when a workspace is being accessed to provide a live presentation, as signaled by the special URL as described with respect to FIG. 3, presentation content delivery module 232 can be configured to suspend displaying of content to the audience (while maintaining the displaying of content to the presenter), or to display a particular content (e.g., some words from the presenter, advertisement, etc.) to the audience. The particular content can also be stored in the workspace, either as part of the presentation content or the additional content.

On the other hand, when the live presentation is underway, presentation content delivery module 232 can be configured to select particular presentation content stored in the workspace for displaying to both the presenter and the audience. In some case, the selection by the presentation content delivery module 232 can be controlled manually by the presenter controlling the flow of the presentation, or by the audience, according to a mode of operation (e.g., presenter navigation mode and autonomous navigation mode). The mode of operation can be switched during the presentation. During such transitions, the portion of the content to be provided for displaying by presentation content delivery module 232 can be updated as directed by the presenter. Presentation content delivery module 232 can also provide the content for displaying before or after the live-presentation, under the control of a user who have access right to the workspace and the presentation content.

In some embodiments, during the live presentation, presentation content delivery module 232 can also be configured to automatically provide different portions of the presentation for displaying to different users based on the content being presented by the presenter. As an illustrative example, when the presenter pushes a poll to an audience, presentation content delivery module 232 can deliver different presentation contents to the presenter and to the audience, such that the audience's view of the content is a slide containing the poll question, while the presenter's view of the content is a slide containing a chart of results based on audience's responses to the poll.

In some embodiments, presentation content delivery module 232 can also automatically select a portion of presentation content for accessing, by updating access right definition 308 stored at the workspace, based on an input from the audience. As an illustrative example, after the presenter pushes as poll, and the audience's answers to the poll indicates that the audiences are employees of a particular company, presentation content delivery module 232 can automatically select the presentation content to be displayed in a manner that reflects the status about the audience. Such a personalization of presentation content delivery can occur automatically and dynamically based on a range of variables including but not limited to previous actions, passive behaviors, personal characteristics, and configuration applied by the presenter to presentation content delivery module 232. In some embodiments, presentation content delivery module 232 can also select the content to be delivered based on data provided by presentation analytics module 206 after it extracts and analyzes the data about the presentation.

Presentation facilitation module 234 is configured to provide information which can assist a presenter in conducting a live presentation. In some embodiments, presentation facilitation module 234 includes a timer. The timer can be configured to monitor how much of the presentation content has been presented and, based on a time measurement, to provide feedback to the presenter (and/or the audience) about whether the presentation is ahead, behind, or in line with the schedule.

In some embodiments, presentation facilitation module 234 also includes a teleprompter tool. The teleprompter tool can be configured to analyze a speech of the presenter and associate it with a particular presentation slide, or other piece of content, and automatically switch between the content based on a result of the analysis, to keep pace with the speech of the presenter.

Figure 4A:
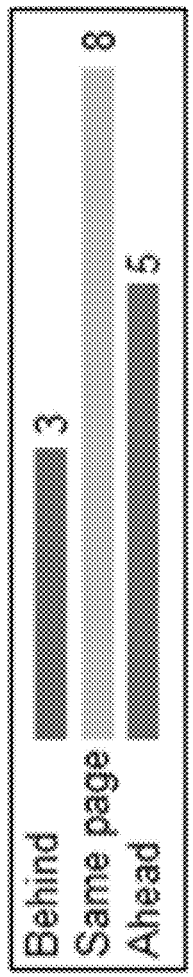
FIG. 4A-B are diagrams illustrating exemplary representations of engagement data provided to facilitate the conducting of a presentation, consistent with embodiments of the present disclosure.

In some embodiments, presentation facilitation module 234 also includes an audience action indicator. The audience action indicator can be configured to monitor an action performed by the audiences during the presentation. The action can reflect an interest or sentiment of the audiences in response to the presentation. For example, as discussed before with respect to FIG. 2C, during the autonomous navigation mode, presentation content delivery module 232 can provide access to the audience portions of presentation data in addition to what is being selected for presenting, thereby enabling the audiences to access a different presentation slide than the one the presenter is presenting. When operating under the autonomous navigation, the audience action indicator can collect information about which portion of the presentation content is accessed by different audience, and provide a summary. For example, referring to FIG. 4A, the live indicator tool can indicate, via an interface 402, the number of audiences who are navigating behind (3), ahead of (5), or at the presentation slide (8) that is currently being presented. Such information can reflect an interest of the audience, and the presenter can adjust the pace of presentation accordingly.

Figure 4B:
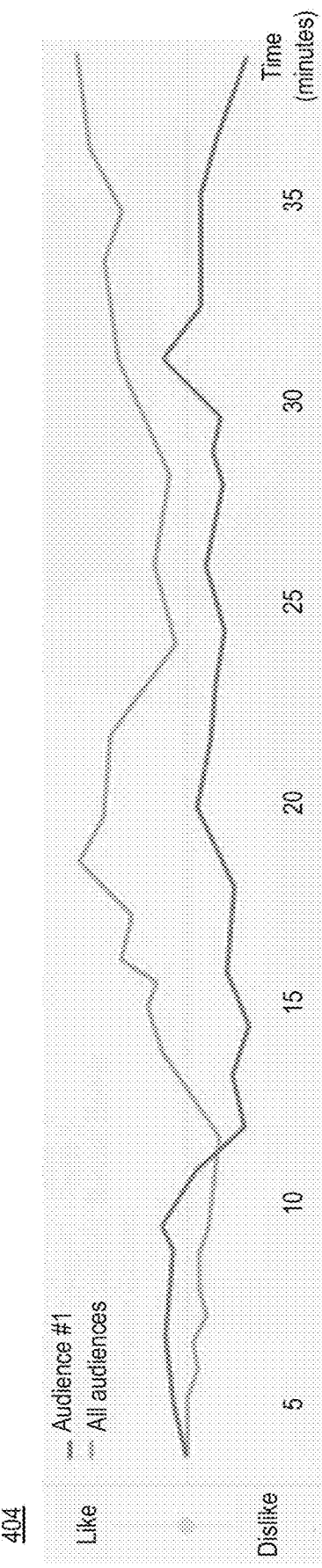

In some embodiments, the live indicator tool can also collect information about other actions from the audience. For example, as discussed before, a presenter can push a poll to the audiences at different times during the presentation. The live indicator tool can collect the responses from the audiences at those moments, and provide a graphical summary. For example, referring to FIG. 4B, the live indicator tool collects the responses from the audiences. The responses can be categorized as "upvote" (to indicate a positive sentiment) or "downvote" (to indicate a negative sentiment), and a plot of the number of received "upvotes" and "downvotes," with respect to time, are provided. Moreover, as shown in FIG. 4B, the number of "upvotes" and "downvotes" received from a particular user (e.g., from audience #1) can be plotted separately from the responses received from other users. Such information can reflect a sentiment of the audiences, and the presenter can also adjust the flow of the presentation accordingly.

Figure 2D:
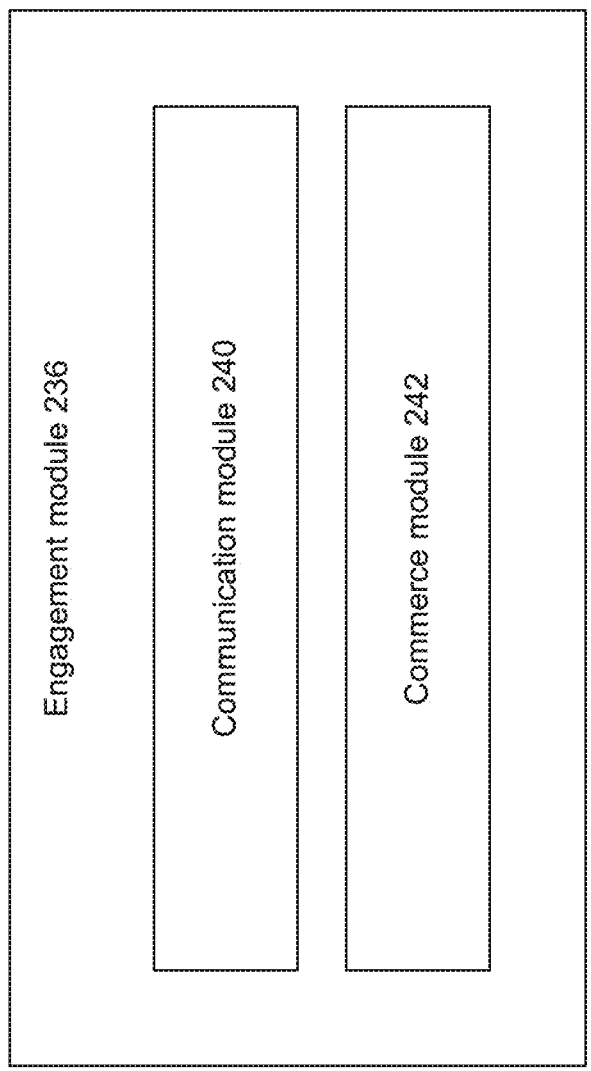

Engagement module 236 is configured to allow additional interactions between the users. As shown in FIG. 2D, engagement module 236 includes a communication module 240 and a commerce module 242.

Communication module 240 enables users who are both accessing a workspace to communicate with each other. Communication module 240 also enables the users to create a text-based communication session while accessing a workspace, and to control who can participate in the communication session. As discussed before, a workspace can be associated with a status, and a user can indicate an intention to engage in a communication session to broadcast the intention in the status, which can also be searched. In some embodiments, communication module 240 also enables the audiences to transmit and broadcast audio data and video during a live presentation, to raise a question or add a comment.

Commerce module 242 enables presenters and users associated with a workspace to engage in a transaction (e.g., sale and purchase of content or products or services, or other commercial commitments). In some embodiments, commerce module 242 enables a user to set up a mechanism of transfer of things of value (e.g., money or points), and an access to a particular content can be predicated on the transfer. For example, a user may be able to sell content including notes, answers to questions, presentation content, etc., that are stored at the workspace, and another user can access these contents after initiating a transfer of money or points through commerce module 242. In some embodiments, commerce module 242 also enables a user to sell items not created or stored at the workspace. For example, a presenter at a charity function can solicit donations during a presentation, and receive the donation through commerce module 242. In addition, commerce module 242 can also be configured to display customized advertising inventory. In some embodiments, commerce module 242 can collect information stored in the workspace (e.g., records of comments and events, the identities of users associated with or following the workspace, etc.) and provide the collected information to a remote advertising serving system. The remote advertising serving system can customize an advertising inventory for displaying based on the information, and then transmit the advertising inventory back to commerce module 242 for displaying.

FIG. 2E is a block diagram illustrating various components of presentation analytics module 206. As shown in FIG. 2E, presentation analytics module 206 includes analytics data extraction module 250, and engagement assessment module 252.

Analytics data extraction module 250 extracts data that can be used for an assessment of a quality of the presentation, from the standpoints of both the presenter and the audiences. The data extracted can include textual data from both internal sources (e.g., presentation content and additional contents stored at the workspace) and external sources (e.g., social media websites). In some embodiments, analytics data extraction module 250 can parse the textual data (e.g., from the presentation content, questions, comments, etc.), and then perform natural language processing to extract concepts (e.g., things, places, persons, context, etc.). In some embodiments, based on a result of processing, analytics data extraction module 250 can annotate the content (e.g., presentation content, comments, etc.) with tags. Such tags can indicate the extracted concepts.

In some embodiments, analytics data extraction module 250 can also perform video recognition and speech to text processing to extract information from the recorded audio and video data of the presentation.

In some embodiments, analytics data extraction module 250 can also extract information about one or more actions undertaken by the users. Those actions can include, for example, the audiences' responses to a poll, the audience's action (or attempted action) to navigate to different portions of the presentation content, the presenter's transitioning between presentation slides, a user's access to the workspace after the presentation, etc. Information about the durations for those actions will also be collected. The data and information extracted by analytics data extraction module 250 can be stored in the workspace associated with the presentation as additional content 304.

Engagement assessment module 252 can perform an assessment of a quality of engagement between the presenter and the audience based on the data extracted by analytics data extraction module 250, based on a set of metrics. The metrics can include, for example, average time spent by the presenter on each presentation slide, sentiment of the audience (as reflected by their responses to the poll and the comments), the number of users accessing the workspace associated with the presentation and following the development of the presentation, etc. The duration of the actions can also be factored into the assessment. For example, in some cases, a number of positive responses received within a short span of time can be given more weight than when the same number of responses is received within a longer span of time.

The result of these analyses can be provided to, for example, presentation content delivery module 232 of FIG. 2C to update the conducting of the presentation. For example, if according to a result of the analysis, the system predicts that the audience will be less interested at some of the slides, presentation content delivery module 232 can allocate less time for presenting those slides can be reduced, or do not provide those slides for displaying at all to the audience.

FIG. 5A-5D are diagrams illustrating exemplary interfaces 500, 530, 560, and 590 for providing an interactive media presentation, consistent with embodiments of the present disclosure. In some embodiments, interfaces 500, 530, 560 and 590 enable a user to access some of the components of interactive presentation system 200 described with respect to FIGS. 2A-2E.

Figure 5A:
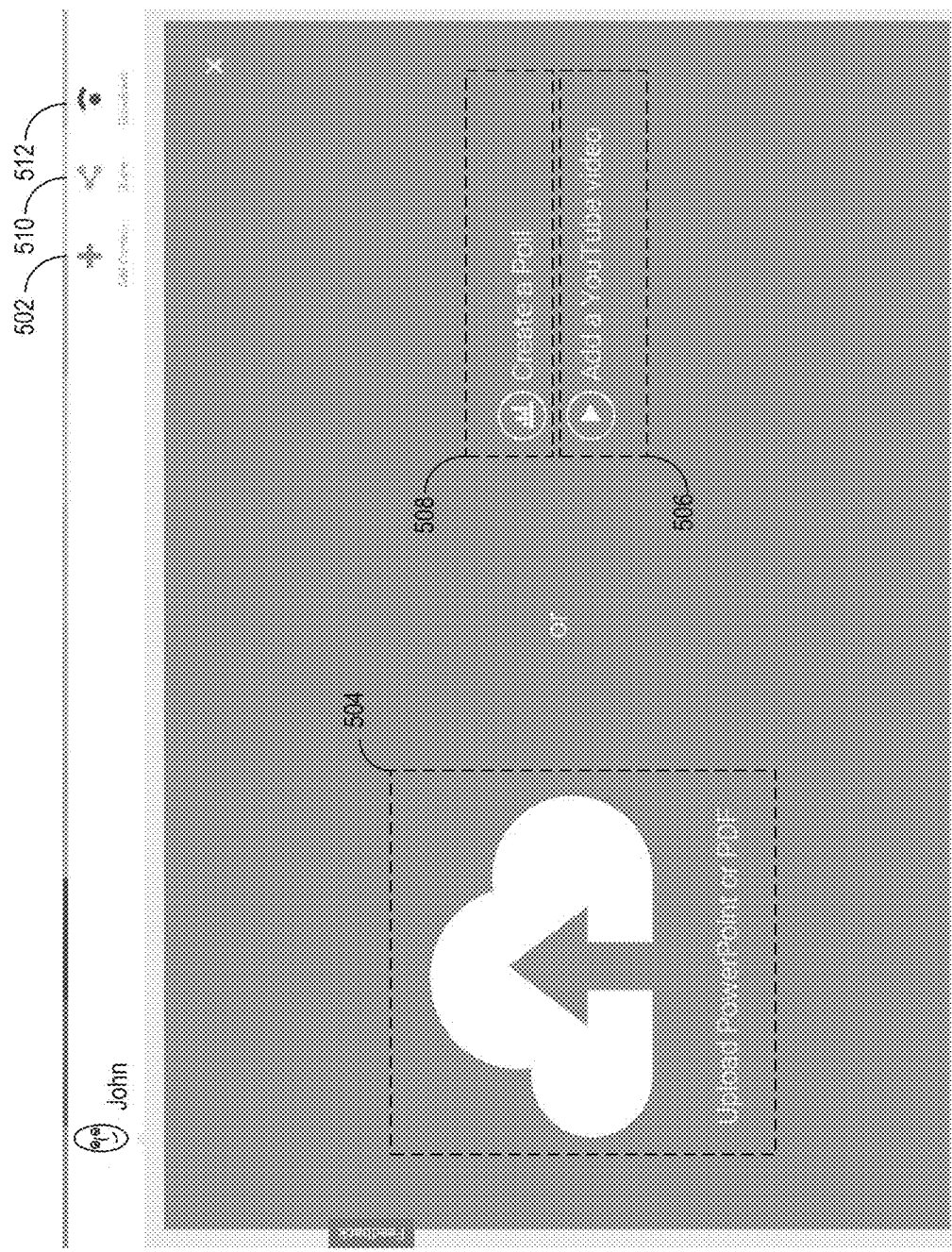
FIG. 5A-5D are diagrams illustrating exemplary interfaces for providing an interactive media presentation, consistent with embodiments of the present disclosure.

Reference is now made to FIG. 5A, which illustrates an interface 500. Interface 500 enables a user to access his or her workspace to create or modify presentation content, and to set the access rights, after logging into the system (e.g., system 200 of FIG. 2A). As shown in FIG. 5A, after a user (John) logs into the system to access his workspace, interface 500 is provided. Interface 500 provides an add content option 502. Upon activation of add content option 502, interface 500 can provide content creation options 504, 506, and 508. Content creation option 504 enables a user to upload a previously-created presentation file of various formats, such as Powerpoint™, Keynote™, PDF, etc. Content creation option 504 enables a user to embed content from external sources into the presentation. In this illustrative example, content creation option 506 enables a user to embed video from Youtube™. Content creation option 508 enables a user to create a poll (or other means for engaging with the audience) to create an interactive presentation.

Interface 500 also provides share option 510 a broadcast option 512 and a publish option, which enable the user to set the access rights to the presentation created. For example, share option 510 enables the user to define a list of users who can access the presentation (or portions of it). Broadcast option 512 enables the user to send an invitation to a list of audience to join a live presentation. Broadcast option 512 also enables the user to set access rights with respect to the presentation content. For example, the user can set an optional access code which the audience needs to provide to join a live presentation. Add content option 502, share option 510, and broadcast option 512 are only available to a user who has edit right to the workspace, and are provided according to information stored at the access right definition 308. In some embodiments, interface 500 enables the user to provide inputs (e.g., access right information, presentation content information, etc.) to presentation content module 220 of FIG. 2B, and the information provided can be stored at a workspace (e.g., workspace 300 of FIG. 3).

Figure 5B:
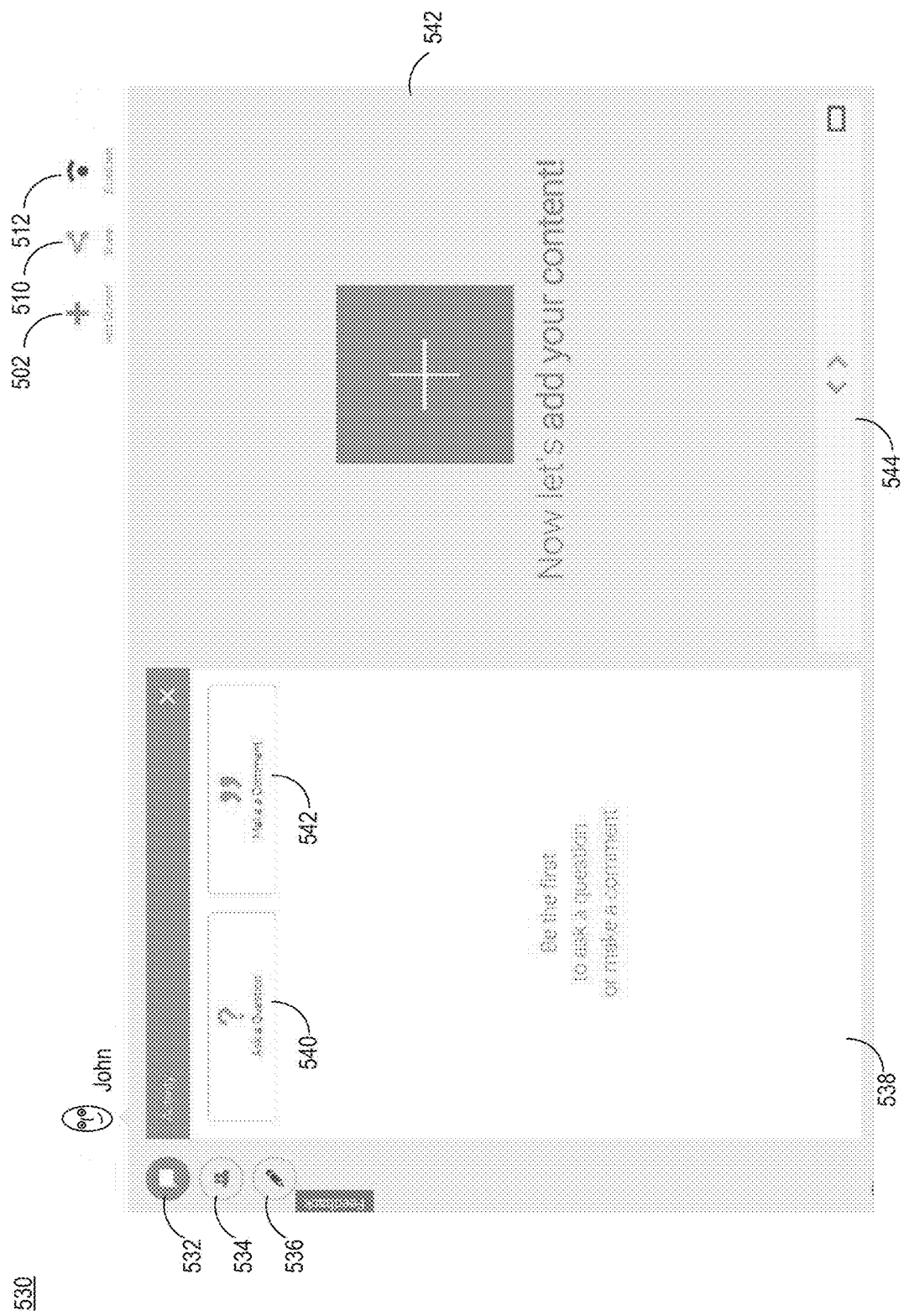

Reference is now made to FIG. 5B, which illustrates an interface 530. Interface 530 enables a user to add comments, to post questions, and to engage with other users. As shown in FIG. 5B, interface 530 includes activity option 532, user listing option 534, and notes option 536. Activity option 532 enables a user to engage with other users through posting questions (by activating ask question option 540) or making comments (by activating make comment option 542). After activity option 532 is activated, an activity interface 538 can be displayed, and the user can type in questions or comments to be displayed in activity interface 538. In some embodiments, the data for the questions and comments are then provided to content workspace module 222 of FIG. 2B, which then stores the data in the workspace (e.g., as part of additional content 304). User listing option 534 enables a user to view a list of users who have access to the workspace, and their statuses (e.g., whether they are currently attending the live presentation, or accessing the workspace, etc.). Upon activation of user listing option 534, an interface can be displayed to provide a graphical representation of the users and their statuses (not shown in FIG. 5B). In some embodiments, user listing option 534 also enable access to the social networking profiles (e.g., Twitter™, Linkedin™, Facebook™, etc.) of these users.

In some embodiments, from the interface, the user can start a text-based communication, through communication module 240 of FIG. 2D, with another user represented in the interface. Notes option 536 enables a user to create and edit textual notes that are private to the user. In some embodiments, notes option 536 interfaces with the notes tool of content workspace module 222. The access rights to various portions of the content created via activity option 532, user listing option 534, and notes option 536 can be configured through share option 510 and broadcast option 512, as discussed before.

Interface 530 also includes a presentation slide navigation interface 542, which displays a presentation slide selected by the user. The selection can be made via a navigation bar 544. In some embodiments, presentation slide navigation interface 542 receives a selection of a presentation slide (through navigation bar 544), and provides the selection information to presentation content delivery module 232 of FIG. 2C, which then selects the relevant portion of presentation content data stored in the workspace according to the selection, and provides the data for displaying to presentation slide navigation interface 542.

Figure 5C:
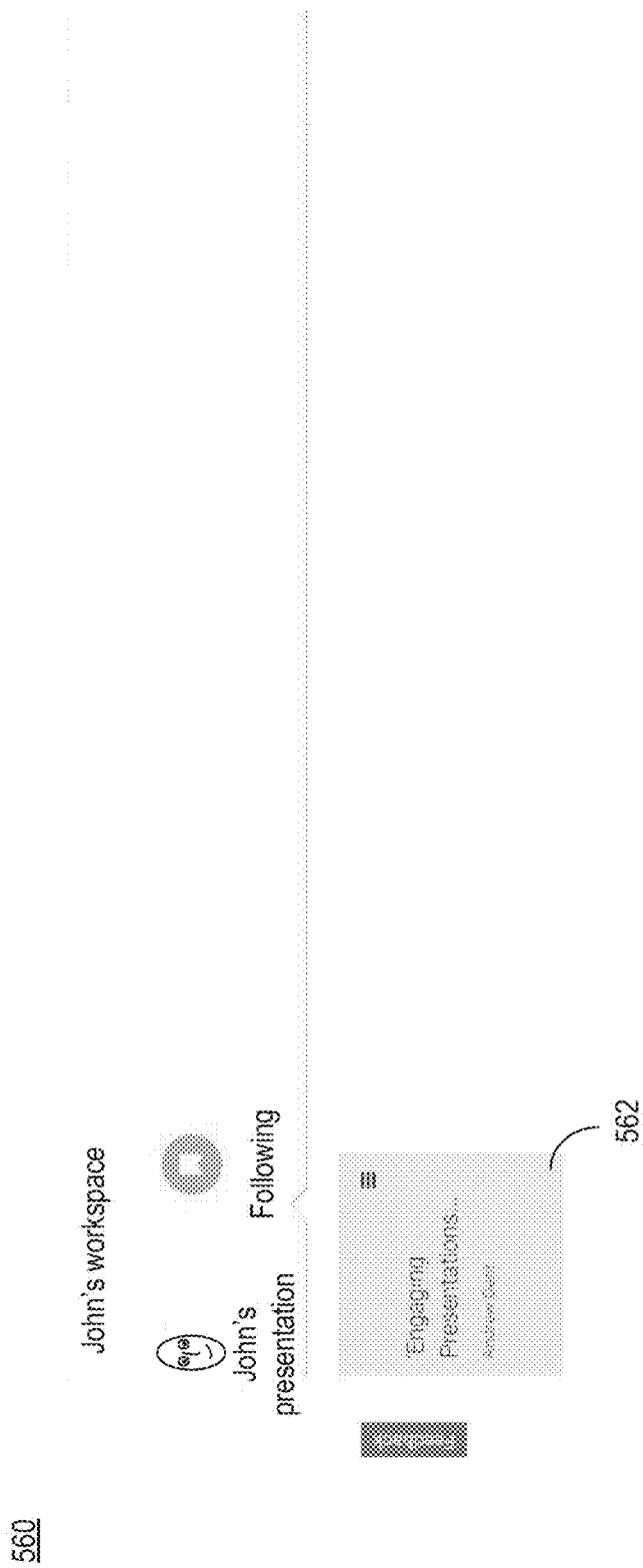

Reference is now made to FIG. 5C, which illustrates an interface 560. Interface 560 enables a user to access other person's workspaces. Interface 560 can display a list of presentation workspaces. For example, as shown in FIG. 5C, interface 560 displays a selectable icon 562 to represent a presentation the user (John) is following. Icon 562 can display information about the presentation, such as the author (Andrew) and the title. In some embodiments, icon 562 can also display an indication (e.g., through change of color, or other means) that the associated workspace has been updated, after content workspace module 222 stores a message at the user's workspace to notify the user about modifications to the presentation (or to the additional content stored at the workspace associated with the presentation). The user can navigate to the listed presentation workspace upon activating icon 562.

Figure 5D:
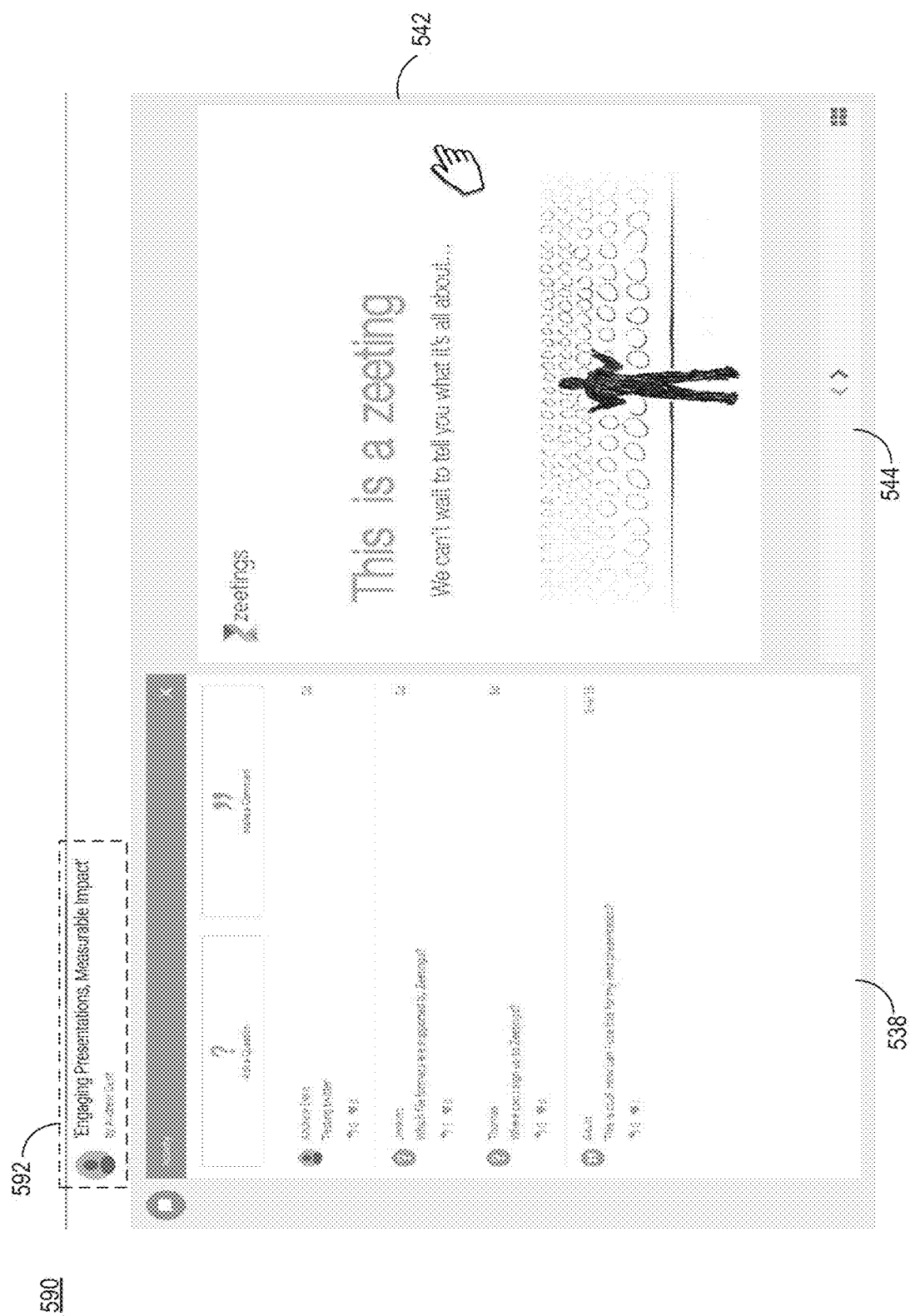

Reference is now made to FIG. 5D, which illustrates an interface 590. Interface 590 displays to a user the content stored at a workspace the user follows, upon activating icon 562 of FIG. 5C. Interface 590 also displays biography information 592 of the presentation. Interface 590 also displays a list of questions and comments provided by other users through interface 538. Interface 590 also provides access to the content of the presentation through presentation slide navigation interface 542 and navigation bar 544. In this illustrative example, add content option 502, share option 510, and broadcast option 512 of FIGS. 5A and 5B are not available, and are not provided in interface 590, as the user (John) is not authorized to edit the content stored at the workspace owned by the author (Andrew), according to access right definition 308 stored in the workspace. In other cases, when the author grants other users the right to edit the presentation, add content option 502, share option 510, and broadcast option 512 will be provided.

Figure 6:
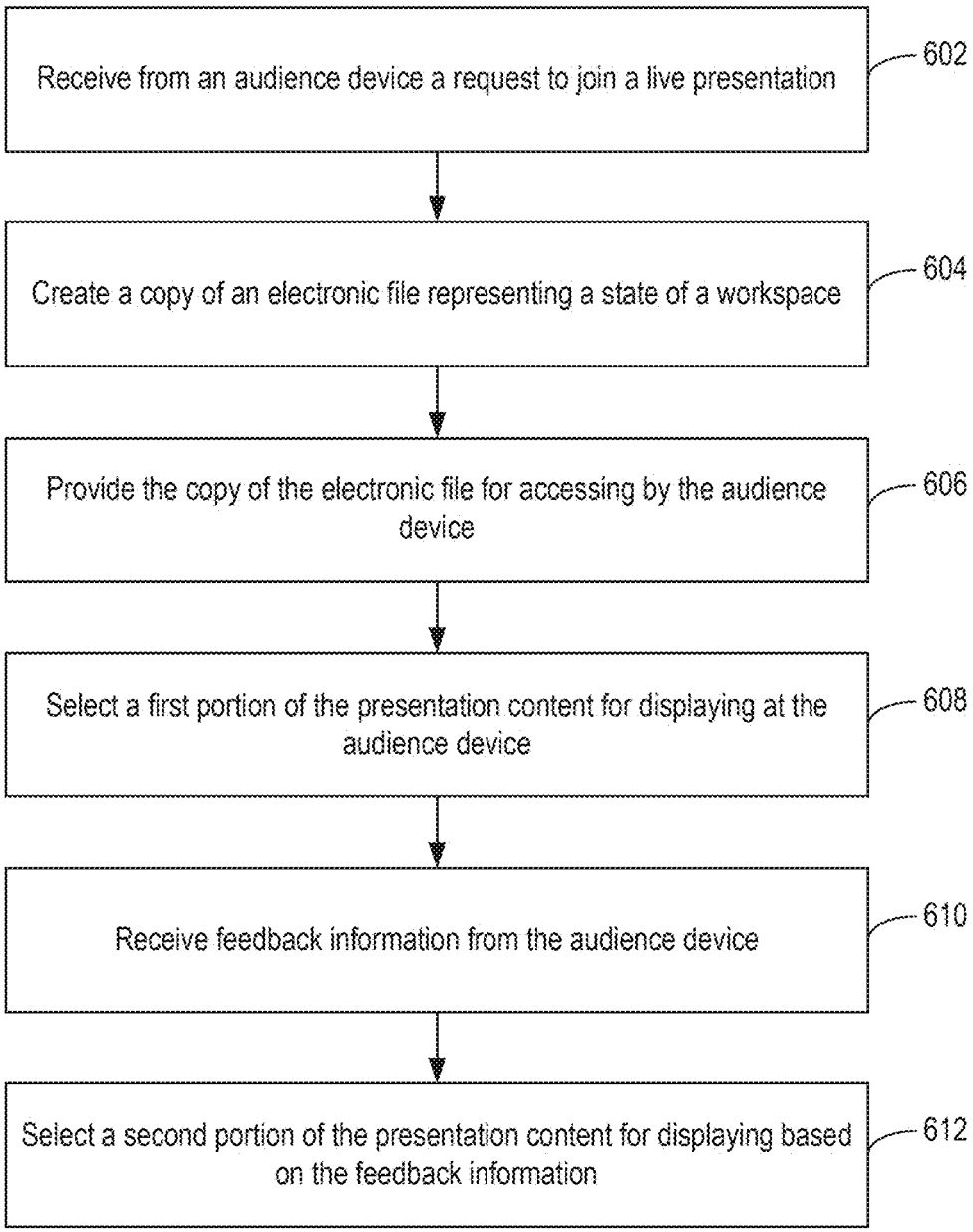
FIG. 6 is a flowchart illustrating an exemplary method for providing an interactive media presentation, consistent with embodiments of the present disclosure.

FIG. 6 is a flowchart illustrating an exemplary method 600 for providing an interactive media presentation, consistent with embodiments of the present disclosure. Method 600 can be performed by interactive presentation system 200 of FIG. 2A. While the methods are described as being performed by interactive presentation system 200, it is appreciated that other components of interactive presentation system or other devices can be involved. It will also be readily appreciated that the illustrated procedure can be altered to delete steps or further include additional steps.

In step 602, the system (e.g., content workspace module 222) receives a request from an audience device (e.g., a mobile device) to join a live presentation hosted by the system. The content of the live presentation is stored in a workspace. The audience device can transmit the request after detecting that the audience clicks on an URL that identifies the workspace from which the live presentation is to be conducted.

In step 604, responsive to receiving the request, content workspace module 222 creates a copy of an electronic file that stores the latest state of the workspace, incorporating all of the most recent modifications or additions to presentation content and/or additional content right before the workspace is accessed in step 602. In step 606, the system provides the copy of the electronic file for accessing by the audience device, enabling the user to participate in the live presentation.

In step 608, the system (e.g., presentation content delivery module 232) selects a first portion of the presentation content for displaying at the audience device. The first portion can be selected by presentation content delivery module 232 based on a mode of operation and the access right information defined in the workspace. For example, during the presenter navigation mode, the first portion is the portion of the presentation content being displayed to the presenter. On the other hand, during the autonomous navigation mode, the first portion can be a portion of the presentation content requested by the audience (e.g., requested via navigation bar 544 of FIG. 5B), provided that the audience is granted access right to that portion of the presentation content.

In step 610, presentation content delivery module 232 receives feedback information generated from the audience device. The feedback information can be in different forms. For example, the audience can transmit, through the audience device, a response to a poll presented during the live presentation. The audience can also add comments, via content workspace module 222, to the workspace. The comments can be extracted and analyzed by presentation analytics module 206.

Based on a result of the analysis by presentation analytics module 206, or the audience's response to the poll, presentation content delivery module 232 selects a second portion of the presentation content to be displayed in step 612. For example, if the result of the analysis, or audience's response to the poll, indicates that the audience may have negative perception about a certain portion of the presentation, presentation analytics module 206 can disregard that certain portion from the selection. The second portion of the presentation content can also be selected based on the result of the analysis or the audience's response to the poll.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

The aforementioned systems described herein have many uses and may be used in a variety of scenarios. For example, the methods and systems described herein may be used in systems for delivering advertising to a user of a mobile device. For example, a user can identify an item, topic, scenery, or location of interest while visiting a place, reading a publication, or watching a movie. Using the inventive systems and methods herein, the user can take a snapshot of the item, the scenery, or anything of interest, and generate an image. The image can be captured including surrounding area and at any view angle. The system then extracts features from the image, generates a query including feature descriptors corresponding to at least some of the images, and submits the query for a search based on the extracted features to a remote server. The additional information that may be displayed to the user can be provided for free to the user, or some or all of the information may be in the form of paid advertising. In some scenarios, one entity may provide the search service and charge vendors for sending the additional information about products or services that are sent to users. In some scenarios, mobile device users may be charged for the ability to retrieve information on products or services using the aforementioned methods and systems.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An access control system for live presentations, comprising:
  at least one processor; and
  a non-transitory storage medium storing instructions that, when executed by the at least one processor, cause the system to perform operations comprising:
    interacting with a first device associated with a first user to create a workspace;
    creating a first copy of the workspace, in response to a request received from a second device associated with a second user;

providing, to the second device, access to the first copy of the workspace according to a mapping table, the mapping table comprising:
  a first dimension for portions of the workspace;
  a second dimension for users, the users including the second user; and
  entries comprising access right indications;
modifying the mapping table during a live presentation by the first user to enable updated access by the second user to the first copy of the workspace; and
providing, to the second device, updated access to the first copy of the workspace according to the modified mapping table.

2. The system of claim 1, wherein the modified mapping table enables the second user to interact with the second device to navigate to a number of previous slides or next slides in the live presentation, with respect to a current slide being presented by the first user.

3. The system of claim 2, wherein the number of previous slides or next slides is one.

4. The system of claim 1, wherein:
the operations further comprise obtaining input from audience devices during the live presentation, the audience devices including the second device; and
the mapping table is dynamically modified based on the audience input.

5. The system of claim 1, wherein the operations further comprise:
obtaining accessed portion information from audience devices, the accessed portion information indicating portions of the workspace accessed by the audience devices; and
providing an indication of the accessed portion information to the first device.

6. The system of claim 1, wherein:
the first copy includes an access history, the access history specifying the second device; and
the operations further comprise:
  receiving an update to the workspace; and
  providing a notification of the update to the second device.

7. The system of claim 6, wherein:
the update comprises at least one of:
  a comment received from an audience device or obtained from an external web site; or
  a modification to the workspace by the first user.

8. An access control method for live presentations, comprising:
creating, by a hosting system and based on instructions received from a first device associated with a first user, a workspace;
creating, by the hosting system, a first copy of the workspace, in response to a request received from a second device associated with a second user;
providing, by the hosting system to the second device, access to the first copy of the workspace according to a mapping table, the mapping table comprising:
  a first dimension for portions of the workspace;
  a second dimension for users, the users including the second user; and
  entries comprising access right indications;
modifying, by the hosting system, the mapping table during a live presentation by the first user to enable updated access by the second user to the first copy of the workspace; and
providing, by the hosting system to the second device, access to the first copy of the workspace according to the modified mapping table.

9. The method of claim 8, wherein the modified mapping table enables the second user to interact with the second device to navigate to a number of previous slides or next slides in the live presentation, with respect to a current slide being presented by the first user.

10. The method of claim 9, wherein the number of previous slides or next slides is one.

11. The method of claim 10, wherein:
the method further comprises obtaining, by the hosting system, input from audience devices during the live presentation, the audience devices including the second device; and
the mapping table is dynamically modified based on the audience input.

12. The method of claim 8, wherein the method further comprises:
obtaining, by the hosting system during the live presentation, accessed portion information from audience devices, the accessed portion information indicating portions of the workspace accessed by the audience devices; and
providing, by the hosting system to the first device during the live presentation, an indication of the accessed portion information.

13. The method of claim 8, wherein:
the first copy includes an access history, the access history specifying the second device; and
the method further comprises:
  receiving an update to the workspace; and
  providing a notification of the update to the second device.

14. The system of claim 13, wherein:
the update comprises at least one of:
  a comment received from an audience device or obtained from an external web site; or
  a modification to the workspace by the first user.

15. A non-transitory computer-readable medium containing instructions that, when executed by a host system, cause the host system to perform operations comprising:
creating, based on instructions received from a first device associated with a first user, a workspace;
creating a first copy of the workspace, in response to a request received from a second device associated with a second user;
providing, to the second device, access to the first copy of the workspace according to a mapping table, the mapping table comprising:
  a first dimension for portions of the workspace;
  a second dimension for users, the users including the second user; and
  entries comprising access right indications;
modifying, by the hosting system, the mapping table during a live presentation by the first user to enable updated access by the second user to the first copy of the workspace; and
providing, by the hosting system to the second device, updated access to the first copy of the workspace according to the modified mapping table.

16. The non-transitory computer-readable medium of claim 15, wherein the modified mapping table enables the second user to interact with the second device to navigate to a number of previous slides or next slides in the live presentation, with respect to a current slide being presented by the first user.

17. The non-transitory computer-readable medium of claim 16, wherein the number of previous slides or next slides is one.

18. The non-transitory computer-readable medium of claim 15, wherein:
- the operations further comprise obtaining, by the hosting system, input from audience devices during the live presentation, the audience devices including the second device; and
- the mapping table is dynamically modified based on the audience input.

19. The non-transitory computer-readable medium of claim 15, wherein the operations further comprise:
- obtaining accessed portion information from audience devices, the accessed portion information indicating portions of the workspace accessed by the audience devices; and
- providing, by the hosting system to the first device, an indication of the accessed portion information.

20. The non-transitory computer-readable medium of claim 15, wherein:
- the first copy includes an access history, the access history specifying the second device; and
- the operations further comprise:
   - receiving an update to the workspace, the update comprising at least one of a comment received from an audience device; a comment obtained from an external website; or a modification to the workspace by the first user; and
   - providing a notification of the update to the second device.

\* \* \* \* \*